United States Patent [19]

Bridges

[11] Patent Number: 4,819,073
[45] Date of Patent: Apr. 4, 1989

[54] FILM VIDEO PLAYER APPARATUS WITH SELECTIVE IMAGE COMPOSING CONTROLS

[75] Inventor: Mark E. Bridges, Spencerport, N.Y.

[73] Assignee: Eastman Kodak Company, Rochester, N.Y.

[21] Appl. No.: 143,661

[22] Filed: Jan. 13, 1988

[51] Int. Cl.$^4$ .............................................. H04N 3/36
[52] U.S. Cl. .................................... 358/214; 358/225
[58] Field of Search ............................... 358/214–216, 358/225

[56] References Cited

U.S. PATENT DOCUMENTS

| 4,485,406 | 11/1984 | Brownstein | 358/214 |
| 4,506,300 | 3/1985 | Fearnside | 358/214 |
| 4,623,929 | 11/1986 | Johnson et al. | 358/214 |
| 4,660,091 | 4/1987 | Notting | 358/214 |
| 4,688,099 | 8/1987 | Funston | 358/214 |

Primary Examiner—Jin F. Ng
Assistant Examiner—Stephen Brinich
Attorney, Agent, or Firm—Robert H. Sproule

[57] ABSTRACT

A film video player (10) has film gates (14, 15) for mounting photographic film (F, F') an imager has a lens (L) for projecting at least a portion of a film frame image from the film on to a sensor (S). The sensor converts an image to a video signal for video display. A zoom carriage (25) changes the magnification of the image with respect to the film frame image. A scan carriage (65) translates the sensor with respect to the film frame image in one axis, and a gear assembly (90) translates the sensor along a perpendicular axis as well as rotating it.

21 Claims, 6 Drawing Sheets

FILM VIDEO PLAYER APPARATUS WITH SELECTIVE IMAGE COMPOSING CONTROLS

CROSS REFERENCE TO RELATED APPLICATIONS

U.S. Application Ser. No. 143,657 for "Video Player Sensor Cable", filed of even date.

TECHNICAL FIELD

The present invention relates generally to a film video player for generating a video signal from photographic film for display on a television monitor or receiver and for selective retention as by recording on a video recorder. More particularly, the invention relates to a film video player for generating a selectively composed video signal from photographic film by means of changing the magnification of the video image relative to the film frame image, of translating the video image relative to the film frame image and of rotating the video image relative to the film frame image.

BACKGROUND ART

Apparatus for sensing photographic color films and for converting a sensed video image into a video signal is well known in the art. Since the development of relatively low cost, reliable solid state image sensors there has been considerable interest in the development of film video players for displaying color film images such as those present on color slides and color negatives on television monitors and receivers. Equipment has also been developed which contemplates the use of a photographic system including a printer with a film video player, wherein a film image is first displayed on a video monitor or receiver, a video image corresponding to only a portion of the film image is selectively displayed for composition purposes and an optical print of a portion of the film corresponding to the selected video image is made.

A primary reason for the interest in composing selected video images constituting a portion of a film image is that the resolution of the commonly used photographic film format is substantially greater than standard television resolution by factors of approximately four to ten times. As will be appreciated, the full available resolution of these film formats is not effectively used at normal magnification where the full frame image substantially fills the solid state image sensor so that the video image effectively just fills the display of a television monitor or receiver. The excess resolution available in these film formats can be advantageously utilized by providing a film video player with means such as zoom optics for selectively changing the magnification of the video image and thus the displayed image with respect to the film image. Since in its magnified form the video image and resultant display constitutes only a portion of the film frame image, it is desirable to be able to effect relative vertical and horizontal translation between the film image and the video image. More advanced composing or editing functions can be carried out where it is possible to effect relative rotation between the film image and the video image.

A common approach in the design of film video players of this type contemplates the use of fixed apparatus for mounting a slide or film negative presenting a film image and a fixed sensor spaced a distance therefrom along the optical axis of the system. Interposed between the fixed film image and fixed sensor is a multi-group variable focal length lens wherein one of the lens elements is movable axially along the optical axis to vary the focal length of the lens and thus provide a zoom capability. Multi-group variable focal length lenses of this type suffer the disadvantage that they are relatively expensive. Such multi-group variable focal length lenses normally require the driving of a plurality of substantially fixed cam surfaces to effect the zoom functions. The cam surfaces are necessarily chosen to meet normal conditions for a particular system and cannot readily be altered or adjusted to accommodate manufacturing or assembly variations in variables such as the focal length of a particular lens or the exact plane where a film image or a sensor are mounted or oriented in a particular player. Normally, attempts to eliminate variables of this nature which degrade the performance of a film video player can be accomplished only by expensive adjustment or customizing procedures which must be employed for each individual unit being manufactured. Thus, the production of film video players employing multi-group variable focal length lenses involves extreme expense in terms of both the cost of the components employed and the labor required for assembly and adjustment due to the necessity for an essentially customized installation.

In the common film video players employing multi-group variable focal length lens as described above, an additional problem frequently encountered is that during scan with a lens being positioned off the optical axis relative to a stationary image sensor and a stationary film image unacceptable vignetting of the video image results. This vignetting can to an extent be controlled by the design of the multi-group variable focal length lens or other system components. However, to provide a multi-group lens which has a full range of zoom and scan characteristics, appropriate clarity without vignetting, an adequate field of view and meets the various required characteristics of a system may be virtually impossible or at least inordinately expensive.

In film video player devices where the photographic film presenting the film image is moved horizontally and vertically to effect scan of the film image relative to the optical axis significant ancillary problems are encountered. Such movement of the film carrying the film image creates mechanical difficulties in effecting quick film change which is highly desirable or in some instances essential in equipment of this type. In particular, whether slides or film negatives are employed, a moving slide or film holder makes it difficult if not impossible under reasonable cost constraints to design mechanisms for rapid loading and unloading of slides, film strips or other film segments. At the very least the utilization of known, inexpensive and proven slide and film change equipment is obviated. Thus, it is highly advantageous in devices of this type that the photographic film be presented in a mounting assembly which remains stationary.

Film video player devices where the sensor may be moved horizontally and vertically for scan purposes and in some instances rotationally, have been employed in the art. There are, however, numerous mechanical complexities in effecting such motions while maintaining interconnections for the substantial circuitry which is required for transmitting a control signal for a solid state image sensor and for transmitting the video signals generated by a solid state sensor. Such known devices have not endeavored to approach the additional mechanical and electrical interconnect complexities which arise in a system where the sensor is required to carry out scanning functions in a plurality of perpendicularly displaced parallel planes as opposed to the known single plane of operation.

DISCLOSURE OF THE INVENTION

Therefore, an object of the present invention is to provide a film video player which is capable of generating a selectively composed video signal from a photographic film image by means of changing the magnification of the video image relative to the film frame image, of translating the video image relative to the film frame image and of rotating the video image relative to the film frame image, all the while maintaining the video image in focus. Another object of the present invention is to provide such a film video player which employs a simple, fixed focal length lens to effect the zoom or magnification functions. Yet another object is to provide such a film video player wherein the photographic film remains in a fixed position during imaging such that a wide variety of conventional equipment may be provided for effecting quick film change, such equipment including mounted slide containers, film strip holders and similar devices. A further object of the invention is to provide such a film video player wherein the lens and the image sensor at all times remain axially aligned although displaced from the optical axis of the apparatus to thereby preclude undesirable optical aberrations such as vignetting.

Another object of the present invention is to provide film video player apparatus wherein a single mechanical assembly effects selective bidirectional rotation of the lens and sensor relative to the photographic film image as well as providing scanning or translating of the lens and sensor in one direction relative to the film image. Yet another object is to provide such a mechanical assembly wherein highly accurate positioning of the lens and sensor elements can be repeatedly effected. Yet a further object of the invention is to provide such an assembly which permits accurate placement of the sensor relative to the lens to maintain the film image in focus on the sensor at all displacements of the lens relative to the photographic film such that the video image remains in focus for all zoom conditions of the player.

Yet another object of the invention is to provide film video player apparatus wherein the moving elements may be powered by accurate stepping motors. A still further object of the invention is to provide such a film video player wherein the mechanical assemblies employed may be of a type and design such that both minimum mechanical play and minimum interference can be realized. Still a further object of the invention is to provide such apparatus wherein the combination of mechanical structure and electrical drive elements is such as to permit accurate, repeatable performance of the apparatus and the employment of a wide variety of types of control systems therefor depending upon the operating parameters for a particular application.

Another object of the invention is to provide film video player apparatus which is capable of employing both proven and new technology equipment from the fields of video and photography. Yet another object of the invention is to provide such apparatus which may combine pricing and performance such as to be attractive for a wide variety of applications.

In general, the present invention contemplates a film video player having gates mounting photographic film in relation to imaging mechanism having a lens for projecting at least a portion of a film frame image on a sensor which converts a sensor image to a video signal for video display including zoom mechanism for changing the magnification of the sensor image with respect to the film frame image, scan mechanism for translating the sensor with respect to the film frame image in a first direction, and a gear assembly for translating the sensor with respect to the film frame image in a second direction perpendicular to the first direction and for rotating the sensor with respect to the film frame image.

PREFERRED EMBODIMENT FOR CARRYING OUT THE INVENTION

Figure 1:
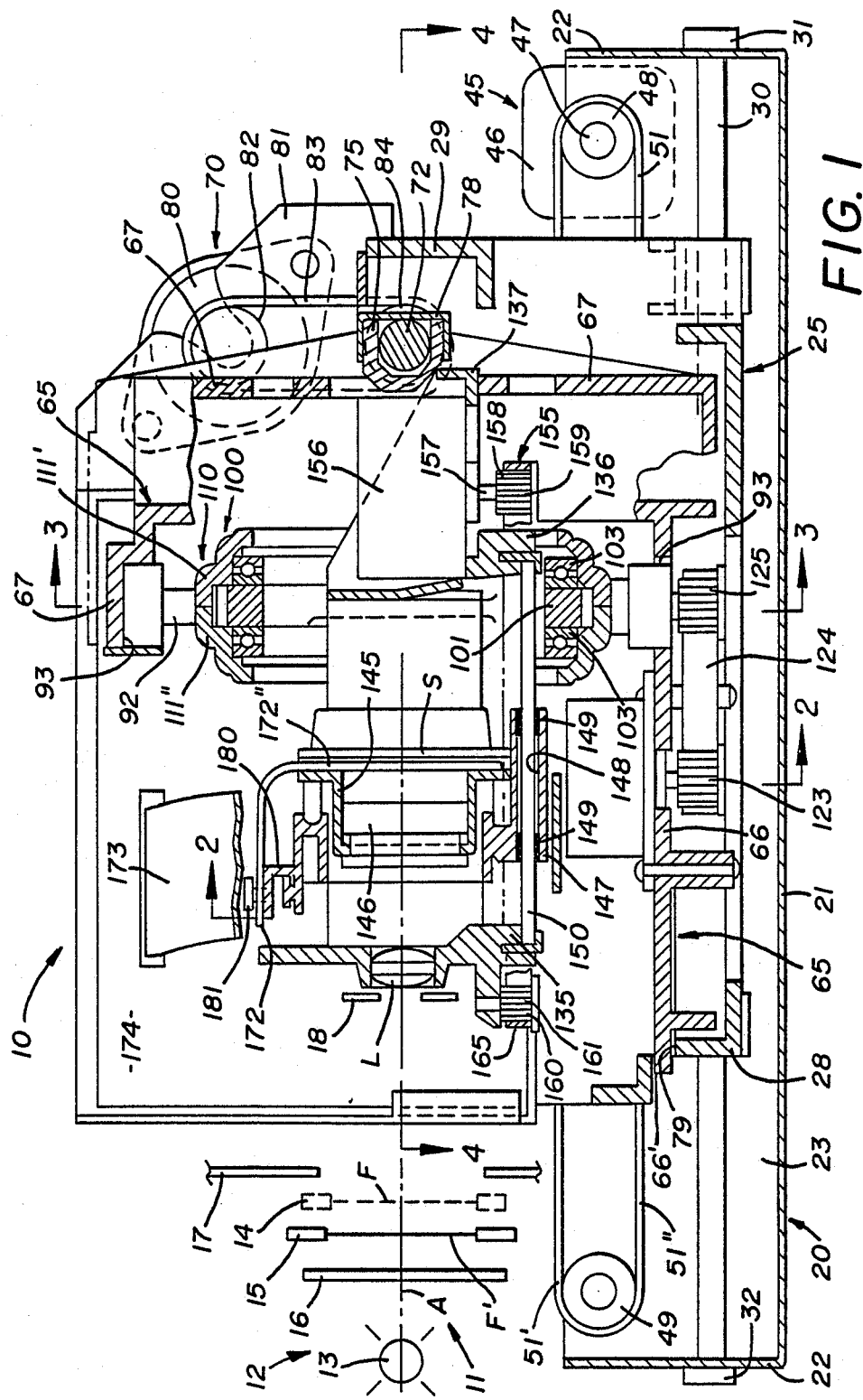
FIG. 1 is a longitudinal sectional view taken substantially along line 1—1 of FIGS. 2, 3 and 4 of film video player apparatus according to the concepts of the present invention with certain elements of the apparatus depicted schematically.

Exemplary film video player apparatus embodying the concepts of the present invention is generally indicated by the numeral 10 in FIG. 1 of the drawings. The film video player includes an optical system, generally indicated by the numeral 11, including light source optics, generally indicated by the numeral 12. The light source optics 12 are shown diagramatically in FIG. 1 and have elements and characteristics which are generally well known to persons skilled in the art. For exemplary purposes the light source optics 12 are shown to include a lamp 13 which may be one of various types of high intensity lamps which provides a light source for illuminating a film gate.

As shown in FIG. 1, there are two film gates 14 and 15 which are illuminated by the lamp 13. The film gates 14 and 15 respectively mount photographic film F and F' therein which may carry a color image constituting the film image for the film video player system 10. The film gates 14, 15 may be suitably adapted to receive slides in one gate and film strips at a second gate. Alternatively, it is to be appreciated that more or less gates could be provided for more or less types of photographic film. As a further alternative, various film formats might be presented at a single film gate.

Interposed between the lamp 13 and the film gates 14, 15 is a diffuser 16 which is adapted to improve the uniformity of the illumination from lamp 13 impinging upon the film gates 14, 15. The light source optics 12 may also include a mask 17 which limits the size of the source image emanating from the film F and F' positioned in the film gates 14, 15. It will also be appreciated by persons skilled in the art that depending upon the type of light source employed, appropriate filters, choppers and attenuators may be employed to provide a light source having a range of intensities and uniformity sufficient to meet the desired operating characteristics of a particular film video player 10.

The optical system 11 has the elements of the light source optics 12 centered upon an optical axis A of the film video player 10. The optical axis A also has positioned thereon at a variable distance from the film gates 14, 15 a fixed focal length lens L. Interposed between the film gates 14, 15 and lens L is an aperture mechanism 18 which may be designed according to known parameters for conformance with operatively interrelated elements of apparatus 10. Displaced to the other side of the lens L from the aperture mechanism 18 is an image sensor S upon which the film image is directed by the lens L. The image sensor S may be a charge coupled device (CCD) of any of various types which are well known in the art and which produce a video signal as an output. Known CCD image sensors produce from an impinging color image a color video signal which may equal or exceed standard television resolution. It will be appreciated by persons skilled in the art that other types of video sensors may be employed depending upon particular applications for a film video player 10. The elements of the light source optics 12 in addition to being centered upon optical axis A are also stationary or fixedly mounted axially of the optical axis A.

The lens L and the image sensor S are mounted in a manner hereinafter described to permit the independent motion of each axially along the optical axis A. In addition, the lens L and the sensor S are mounted to permit selective scan or translation in all directions and rotation in any plane perpendicular to the optical axis A within the limits of travel of the lens L and sensor S axially of the optical axis A.

The film video player 10 has as a primary structural member supporting lens L and sensor S a base, generally indicated by the numeral 20. The base 20 is rigidly mounted with respect to conventional mounting elements (not shown) for the light source optics 12. As shown, the base 20 has a generally rectangular bottom platform 21 with the longitudinal dimension thereof paralleling the optical axis A. The base 20 has upturned supports 22 at the longitudinal extremities (see FIG. 1) and an upturned support 23 along one longitudinal side thereof (see FIGS. 1–4).

Figure 2:
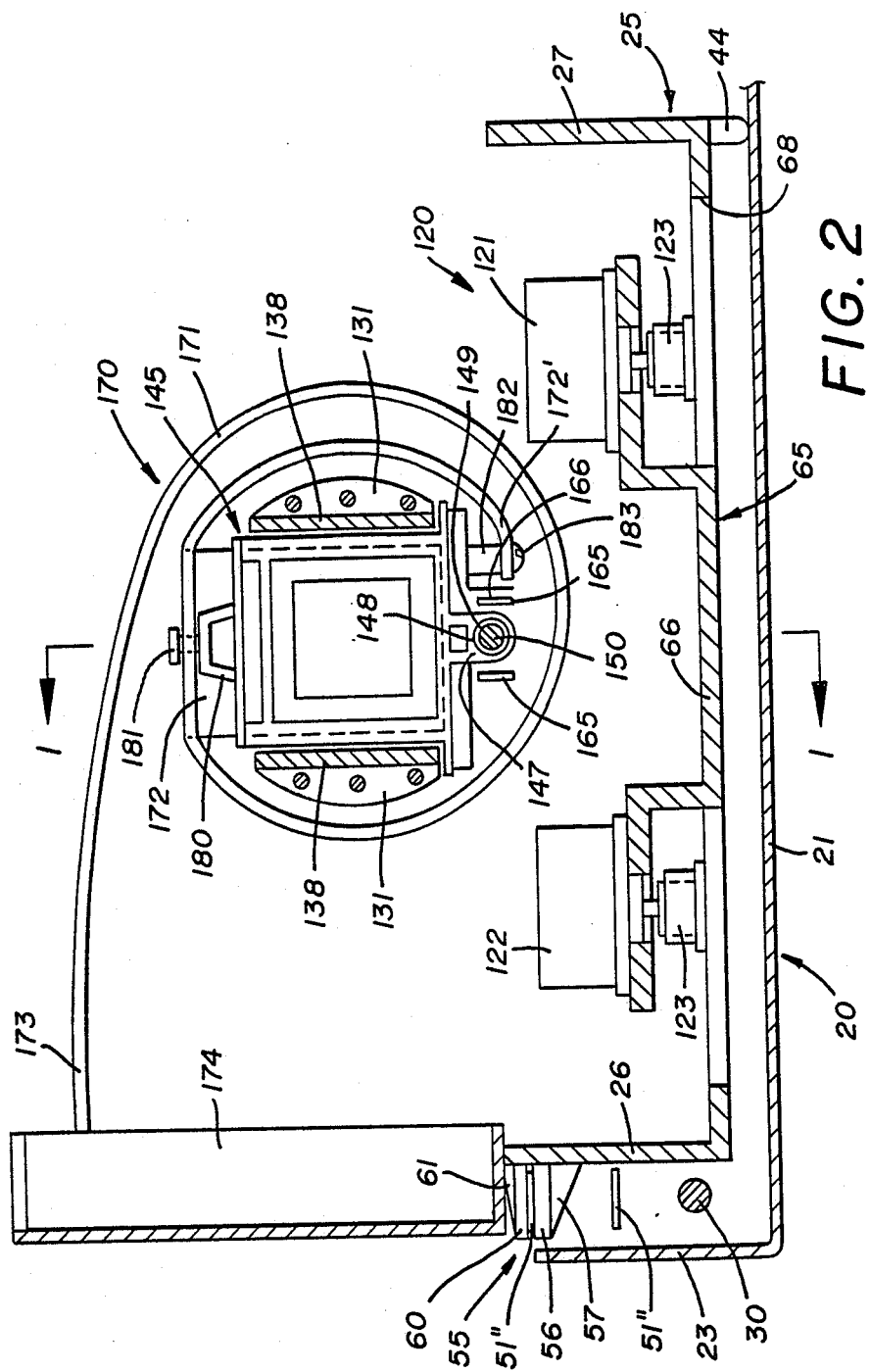
FIG. 2 is a fragmentary cross-sectional view of the film video player apparatus of FIG. 1 taken substantially along the line 2—2 of FIG. 1.

The lens L and image sensor S are jointly movable axially of the optical axis A and longitudinally relative to the base 20 by virtue of the structural interrelation with a zoom carriage, generally indicated by the numeral 25. As seen particularly in FIGS. 2, 3, and 4, the zoom carriage 25 has a generally rectangular cupped configuration bounded on the sides extending longitudinally of the base 20 by upstanding walls 26 and 27 (FIG. 2). The carriage 25 has at its longitudinal extremities proximate the light source optics 12, an upstanding wall 28 and at the opposite longitudinal extremity a substantially higher upstanding wall 29 (FIG. 1).

The zoom carriage 25 is mounted for movement longitudinally of the base 20 on a zoom rod 30 which extends the length of the base 20, between upturned supports 22, and preferably proximate and paralleling upturned support 23. As shown, the zoom rod 30 may be secured relative to the base 20 as by a head 31 or enlarged diameter portion at one extremity thereof and a retainer 32 at the opposite extremity thereof.

Figure 3:
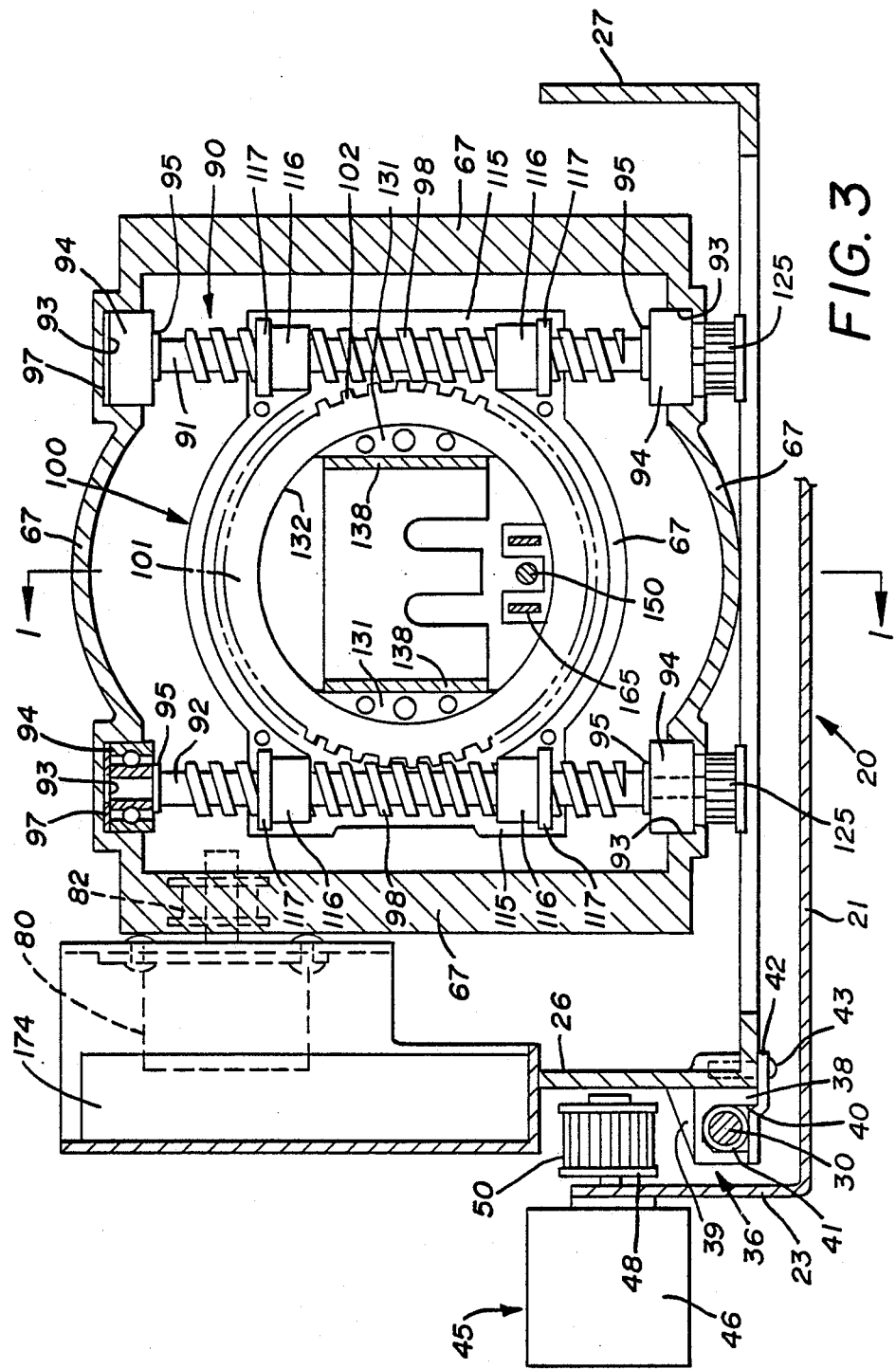
FIG. 3 is a fragmentary cross-sectional view of the film video player apparatus of FIG. 1 taken substantially along the line 3—3 of FIG. 1.

The zoom carriage 25 is physically attached to the zoom rod 30 by a pair of rod receivers, generally indicated by the numerals 35 and 36. The rod receivers 35, 36 may be identical and project laterally outwardly of upstanding wall 26 preferably proximate the extremities thereof as best seen in FIG. 3. Each of the rod receivers 35, 36 consists of a mounting block 38 which may be provided with a reinforcing rib 39. The mounting block 38 has a downwardly directed U-shaped channel 40 which is adapted to receive a bushing 41 which receives the zoom rod 30. The bushing 41 is maintained within U-shaped channel 40 by a bushing retainer plate 42 which may be selectively attached to zoom carriage 25 as by a fastener 43. The side of zoom carriage 25 opposite rod receivers 35, 36 mounts preferably substantially underlying wall 27 one or more rounded glides 44 (FIG. 2) which slidably engage platform 21 of base 20. It will be understood that wheels or other friction reducing members may be employed in lieu of glides 44. It will thus be appreciated that the zoom carriage 35 moves longitudinally relative to the base 20 by virtue of the bushings 41 within the rod receivers 35, 36 slidably engaging the zoom rod 30 and the glides 44 slidably engaging platform 21.

The zoom carriage 25 is driven along and selectively precisely located axially of zoom rod 30 by a zoom carriage drive assembly, generally indicated by the numeral 45. The drive assembly 45 consists of a zoom motor 46 which is preferably a stepper motor of a type which can be advanced with suitable known controls through selected numbers of highly accurate angular increments. The zoom motor 46 may conveniently be mounted on the upturned support 23 of base 20 and have a shaft 47 which mounts a zoom motor pulley 48. The zoom motor 46 is preferably mounted on upturned support 23 proximate one end of the base 20 with an idler pulley 49 mounted proximate the opposite longitudinal end of the base 20 (FIG. 1). The pulleys 48, 49 preferably have teeth 50 (FIG. 3) which are adapted to matingly engage a conventional timing belt 51 having teeth 52 interiorly thereof as seen in FIG. 5 which operatively engage the teeth 50 of each of the pulleys 48 and 49 such that the angular motion of shaft 47 of zoom motor 46 is translated to accurate linear travel of the timing belt 51 between the pulleys 48, 49.

Figure 4:
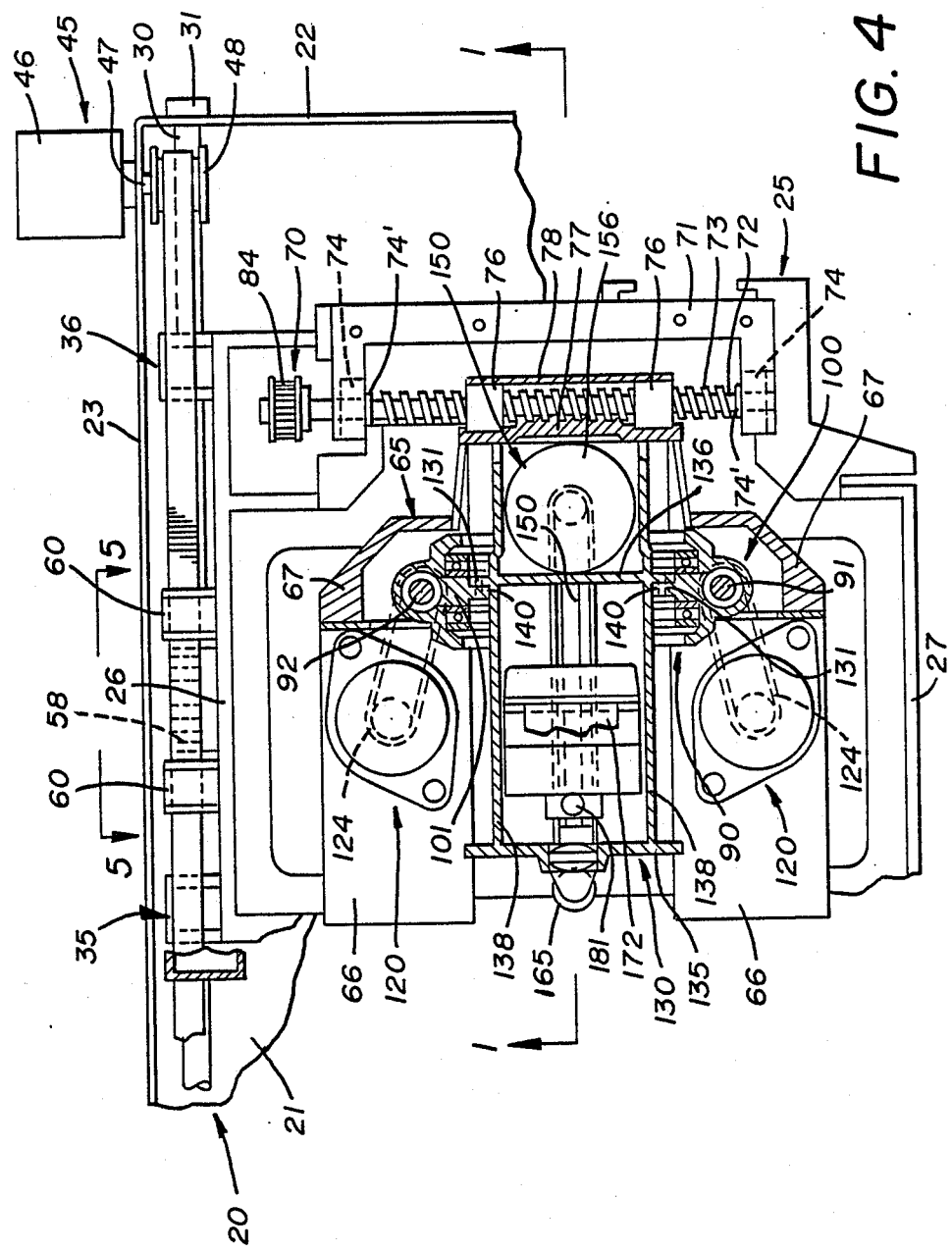
FIG. 4 is a cross-sectional view of the film video player apparatus of FIG. 1 taken substantially along the line 4—4 of FIG. 1.
Figure 5:
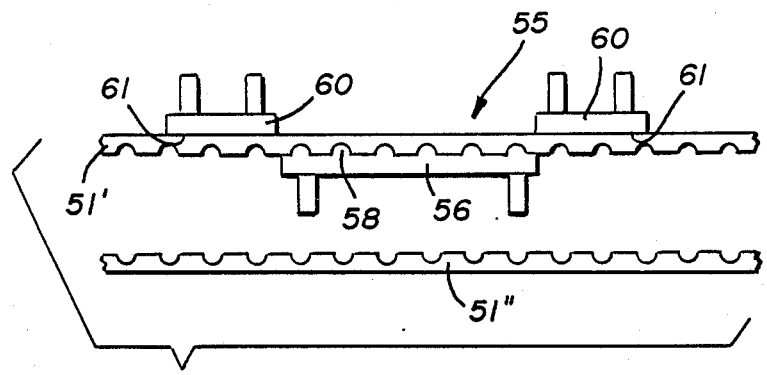
FIG. 5 is a fragmentary elevational view taken substantially along the line 5—5 of FIG. 4 and depicting particularly the attachment of the zoom drive assembly and the zoom cartridge.

The zoom carriage 25 is displaced longitudinally of base 20 on zoom rod 30 by a belt retaining assembly, generally indicated by the numeral 55, interconnected with the timing belt 51, as best seen in FIGS. 2, 4, and 5. As shown, the belt retaining assembly 55 has a drive plate 56 which may be attached outwardly of upstanding wall 26 of zoom carriage 25. The drive plate 56 may have a reinforcing rib 57 positioned thereunder. The timing belt 51 has, as seen in FIGS. 1, 2 and 5, an upper reach 51' and a lower reach 51''. The upper reach 51' of belt 51 is positioned just above the drive plate 56 which has teeth 58 which matingly engage with the teeth 52 interiorly of the timing belt 51. The upper reach 51' of belt 51 is maintained in interlocking engagement with the drive plate 56 of carriage 25 by virtue of one or more guide plates 60. The guide plates 60 are attached to wall 26 and may have reinforcing ribs 61 thereabove in a manner similar to the mounting of the drive plate 56. As shown, there are two guide plates 60 positioned longitudinally of zoom carriage 25 just beyond the extremities of drive plate 56 and displaced thereabove a distance of approximately the thickness of timing belt 51. The guide plates 60 have a smooth lower guide surface 61 which engages the outer surface of timing belt 51 and thus maintains the timing belt 51 in engagement with the drive plate 56 so that the zoom carriage 25 is linearly displaced the exact distance that timing belt 51 is displaced by zoom motor 46. The arrangement of the drive belt 56 and guide plates 60 is such that the timing belt 51 remains engaged with drive plate 56 despite possible variations in belt tension, while permitting the replacement of timing belt 51 when necessary.

The lens L and image sensor S are jointly translatable or scannable in one direction in an infinite number of planes perpendicular to optical axis A by virtue of structural interrelation with a scan carriage, generally indicated by the numeral 65. As best seen in FIGS. 1, 2 and 4, the scan carriage 65 is of a generally L-shaped configuration having a flat base 66 and a somewhat cup-shaped upstanding portion 67. The flat base 66 may repose in a cutout 68 in the zoom carriage 25 to facilitate the achievement of a compact design for the film video player 10.

As shown, the scan carriage 65 is movable laterally or horizontally of the zoom carriage 25 by a scan drive assembly, generally indicated by the numeral 70. The upstanding wall 29 of zoom carriage 25 mounts a yoke 71 in which a worm shaft 72 having teeth 73 is journaled. The yoke 71 may, for example, mount spaced bearings 74 which support the worm shaft 72. Rings 74' or other retainers may be positioned on the worm shaft 72 proximate the bearings 74. The cup-shaped upstanding portion 67 of scan carriage 65 has preferably substantially medially vertically thereof a rearwardly directed C-shaped receiver 75 (FIG. 1).

As seen in FIGS. 1 and 3, the C-shaped receiver 75 mounts a pair of spaced bushings 76 which receive the worm shaft 72. The C-shaped receiver 75 has interposed between the bushings 76 a toothed drive plate 77 which matingly engages the teeth 73 of worm shaft 72. A shaft retainer 78 which may also be C-shaped interfits with the C-shaped receiver 75 to effect retention of the bushings 76 and thus maintain the worm shaft 72 and teeth 73 thereof in engagement with the toothed drive plate 77. It will thus be appreciated that rotation of the worm shaft 72 will effect the displacement of the scan carriage 65 axially of the worm shaft 72 and therefore laterally of the zoom carriage 25 and base 20. The end 66' of flat base 66 of scan carriage 65 opposite upstanding portion 67 is slidably supported in a lateral slot 79 in wall 28 of zoom carriage 25 (FIG. 1), it being understood that wheels or other friction reducing members might be employed in lieu of or in addition to the sliding support shown.

The scan drive assembly 70 effects rotation of the worm shaft 72 through actuation of a scan motor 80 shown in FIGS. 1 and 3. The scan motor 80 may conveniently be mounted on zoom carriage 25 on an upstanding wall 81 thereof. The scan motor 80 may be a stepper motor possessing characteristics comparable to zoom motor 46. The scan motor 80 mounts a drive pulley 82 which carries a timing belt 83, which may be comparable to the timing belt 51, that engages a driven pully 84 which is nonrotatably affixed to the worm shaft 72. It will thus be appreciated that the scan motor 80 may be selectively driven in two directions to effect rotation of the worm shaft 72 to position the bushings 76 and drive plate 77 and thus the scan carriage 65 at any desired location along worm shaft 72 within the confines of the yoke 71 and thus laterally relative to zoom carriage 25.

Figure 6:
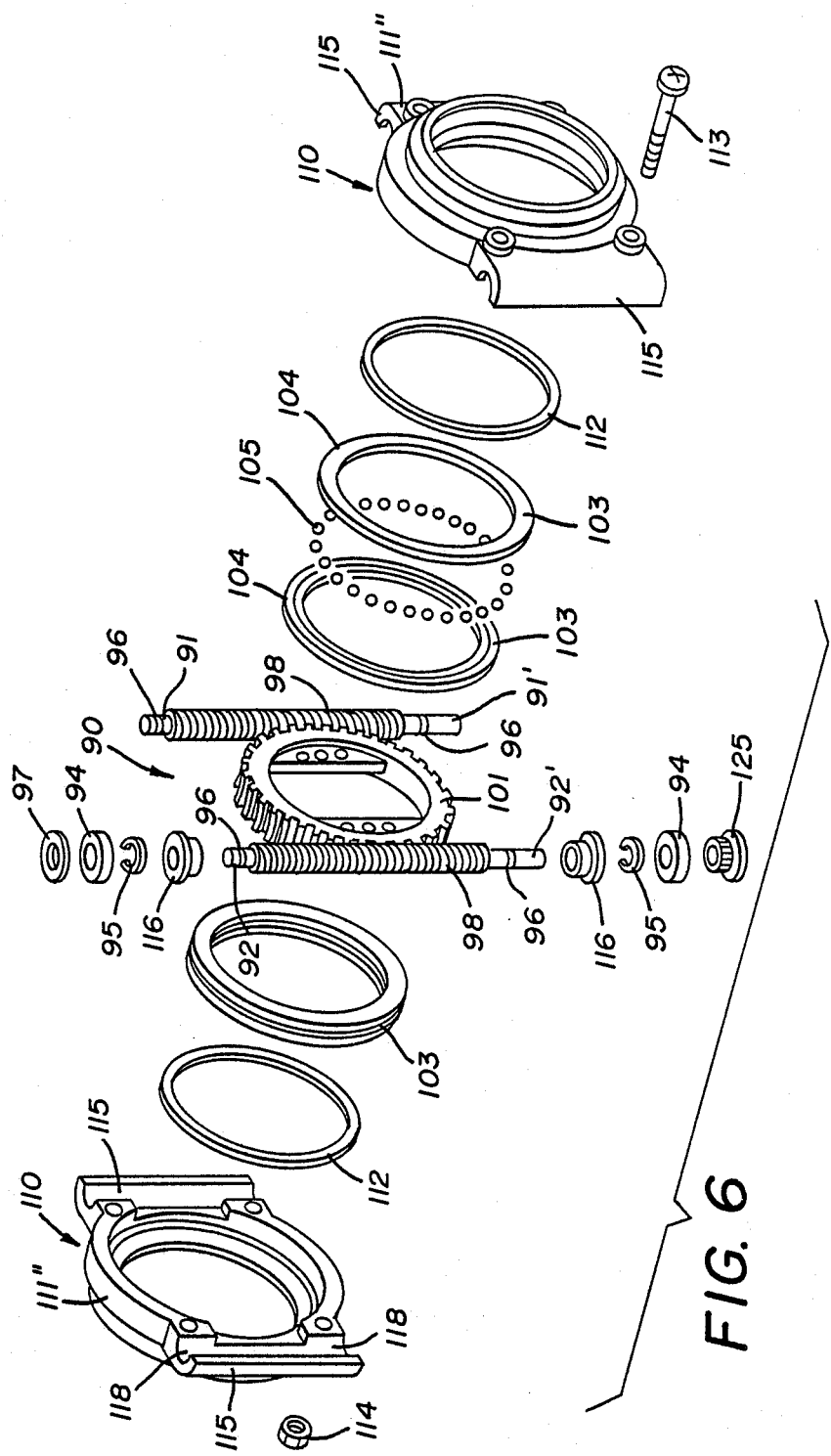
FIG. 6 is an exploded perspective view depicting the gear assembly including the worm shafts, helical gear, housing and related components.

The lens L and image sensor S are jointly translatable or scannable in a direction perpendicular to the direction of movement of scan carriage 65, in this instance vertically, and rotated in an infinite number of planes perpendicular to optical axis A by virtue of structural interrelation with a gear assembly, generally indicated by the numeral 90 in FIGS. 1, 3, 4 and 6. As best seen in FIGS. 3, 4 and 6, the gear assembly 90 includes a pair of worm shafts 91 and 92. The worm shafts 91, 92 are mounted in the cup-shaped upstanding portion 67 of scan carriage 65 such as to be in fixed spaced parallel relation. As shown, the cup-shaped portion 67 of scan carriage 65 has integral bearing seats 93 in which each extremity of each of the worm shafts 91 and 92 is supported. In particular, each extremity of each of worm shafts 91, 92 is supported by ball bearings 94, which repose within each of the bearing seats 93, to permit free rotation of the worm shafts 91 and 92. As may be seen in FIG. 6, the bearings 94 may be retained in the bearing seats 93 as by C-rings 95 which are positioned in grooves 96 proximate each extremity of each of the worm shafts 91, 92. In order to permit a limited extent of axial displacement of the worm shafts 91, 92, an annular compliant member 97 may be positioned at one end of each of the worm shafts 91, 92 axially outwardly of the bearings 94 and within the confines of the bearing seats 93. Each of the worm shafts 91, 92 have helical threads 98 disposed over a substantial portion of the length thereof between the axially spaced bearings 94. The helical threads 98 of each of the worm shafts 91, 92 may be of conventional design with both having either right-hand or left-hand threads for reasons which will become apparent hereinafter.

As best seen in FIGS. 3, 4 and 6, the gear assembly 90 has interposed between and operatively coacting with worm shafts 91, 92 a worm gear mechanism, generally indicated by the numeral 100. Central to the worm gear mechanism 100 is a worm gear 101 which has a diameter such that the teeth 102 thereof matingly engage with the helical threads 98 of each of the worm shafts 91, 92 when worm gear 101 is juxtapositioned therebetween, as best seen in FIG. 3. As best seen in FIGS. 1 and 6, the worm gear mechanism 100 may have a bearing assembly 103 positioned axially to either side of the worm gear 101. As shown particularly in FIG. 6, each bearing assembly 103 may include a pair of bearing races 104 which encapsulate ball bearings 105 therebetween.

A clamshell housing, generally indicated by the numeral 110, having a pair of identical cup-shaped halves 111' and 111" encapsulates the worm gear 101 and the bearing assemblies 103. Additionally, an annular compliant member 112 may be disposed axially outwardly of each of the bearing assemblies 103 and constrained within the halves 111', 111" of the clamshell housing 100 to provide an extent of resilience to the mounting of worm gear 101 within housing 110. For purposes of assembling and disassembling the clamshell housing 110 the halves 111', 111" may be selectively joined and separated by removable fasteners such as machine screws 113 and complementary nuts 114.

As best seen in FIGS. 3 and 6 the cup-shaped halves 111', 111" of clamshell housing 110 each have a pair of projecting ears 115 which are U-shaped in cross-section and which, when the halves 111', 111" are joined, form bores which clear the worm shafts 91, 92. The worm shafts 91 and 92 are each journaled in the housing 110 in bushings 116 which are preferably positioned near the vertical top and bottom of each of the ears 115 of the housing 100. The busings 116 may each have an increased diameter portion 117 which engages grooves 118 proximate the vertical extremities of the ears 115.

It will be observed that with the worm shafts 91, 92 both having the same hand helical threads that rotation of each of the worm shafts 91, 92 at the same angular velocity for the same time period produces a vertical displacement of worm gear 101 and therefore housing 110. It should be understood in this respect that such vertical displacement of the worm gear 101 would not result in rotation of the worm gear 101. In the event that the worm shafts 91, 92 are rotated at the same angular velocity for the same time period in opposite directions, the worm gear 101 and housing 110 would remain vertically fixed relative to the worm shafts 91, 92 while the worm gear 101 would be rotated. A reversal of the direction of rotation of each of the worm shafts 91, 92 would produce rotation of the worm gear 101 in the opposite direction. By thus controlling the direction and extent of rotation of worm shafts 91, 92 a controlled vertical translation distance and bidirectional rotation of the worm gear 101 through desired angles may be achieved.

The worm shafts 91, 92 of gear assembly 90 are independently driven by a worm shaft drive assembly, generally indicated by the numeral 120. The worm shaft drive assembly 120 consists of stepper motors 121 and 122 which selectively directionally rotationally drive the worm shafts 91 and 92, respectively. As seen in part in each of Figs. 1–6, the stepper motors 121, 122 may be mounted on the flat base 66 of scan carriage 65 displaced a distance from the bearing seats 93 in cup-shaped upstanding portion 67 of scan carriage 65 (FIGS. 1 and 2). Each of the stepper motors 121 and 122 mounts a drive pulley 123 which carries a timing belt 124 (FIGS. 1 and 4). The timing belts 124 also engage pulleys 125 which are nonrotatably attached to extensions 91' and 92' of the worm shafts 91 and 92 extending through the bearing seats 93 in the lower extremity of portion 67 of scan carriage 65 (FIGS. 1, 3 and 6). It will thus be appreciated that controlled drive of stepper motors 121 and 122 will effect rotations of the worm shafts 91 and 92, respectively, to produce a desired extent of rotation in a desired direction. As previously detailed this controlled rotation of shafts 91, 92 provides the controlled vertical translation and bidirectional rotation of the worm gear 101 which is transmitted to the lens L and image sensor S.

The worm gear 101 is thus driven by the just described rotational and vertical translating or scanning motion imparted by rotation of worm shafts 91, 92, the horizontal translation or scanning imparted by the horizontal movement of scanning carriage 65 carrying the worm shaft gear assembly 90, and the motion of the zoom carriage 25 carrying the scanning carriage 65 relative to the base 20. These combined motions are transmitted to a lens box assembly generally indicated by the numeral 130. As best seen in FIGS. 3 and 4, the lens box assembly is attached centrally of the worm gear 101 of the worm gear mechanism 100. As shown, the worm gear has a pair of diametrically opposed sector plates 131, 131 which extend into the otherwise circular aperature 132 in the worm gear 101.

The lens box assembly 130 is an elongated rectangular structure having, as seen in FIGS. 1 and 4, a lens support portion 135, a gear engagement portion 136, and a motor retainer 137. As best seen in FIG. 4, the lens support portion 135, the gear engagement portion 136 and the motor retainer portion 137 are spaced and joined by a pair of parallel side plates 138, 138. The side plates 138 in the vicinity of gear engagement portion 136 are spaced a distance such as to interfit within and engage the sector plates 131, 131 of worm gear 101. Additionally, in the area of gear engagement portion 136 of lens box assembly 130 a pair of flanges 140, 140 extend outwardly of the side plates 138 and therefore overlie and may substantially conform to the configuration of the sector plates 131. The flanges 140 are attached to the sector plates 131 as by suitable fasteners such as machine screws (now shown).

The lens support portion 135 of lens box assembly 130 is provided with suitable elements for mounting a lens L of whatever type is to be employed in the film video player apparatus 10. It will be understood that for different configurations of a lens L and aperture mechanism 18, different structural elements may be required to effect the necessary mounting and alignment. The sensor S is affixed to a sensor carriage 145 which includes suitable elements for mounting and aligning a particular sensor to be employed in the film video player apparatus 10. The sensor carriage 145 may also contain suitable mounting elements for carrying other elements such as one or more filters 146 which may be advantageously mounted in proximity to the sensor S.

The sensor S is necessarily positioned a different distance from the lens L for every different distance reflecting magnification between the lens L and the source image originating at the film gates 14 and 15, as may be established by movement of zoom carriage 25. This adjustment of the distance between the sensor S and lens L is affected by moving the sensor carriage 145 relative to the lens L and other elements of lens box assembly 130. As shown, the sensor carriage 145 has a projecting hub 147 which has a through bore 148 therein. The through bore 148 seats proximate each axial extremity thereof bushings 149 which receive a carriage support rod 150. The carriage support rod 150 is attached to lens box assembly 130 and particularly may be interconnected between the lens support portion 135 and the gear engagement portion 136 thereof (FIG. 1).

The travel of the sensor carriage 145 axially along carriage support rod 150 to space the sensor S a selected distance from lens L is accomplished by a sensor carriage drive assembly, generally indicated by the numeral 155. As seen in FIGS. 1 and 4, the sensor carriage drive assembly 155 is powered by a sensor carriage stepper motor 156 which may be of the type employed as the zoom motor 46. The stepper motor 156 may be supported on the lens box assembly 130 and particularly may be supported to the rear of the extent of travel of sensor carriage 145 and particularly between the gear engagement portion 136 and motor retainer portion 137 of lens box assembly 130. As best seen in FIG. 1, the sensor carriage stepper motor 156 has a shaft 157 which mounts a drive pulley 158 having teeth 159. The lens support portion 135 of lens box 130 mounts an idler pulley 160 having teeth 161. The teeth 159, 161 of the pulleys 158 and 160, respectively, engage a timing belt 165 of the type employed in conjunction with the zoom carriage drive assembly 45. The sensor carriage 145 is attached to the timing belt 165 as by means of a slot 166 which may be positioned in the hub 147 of the sensor carriage 145 (Fig. 2). The slot 166 may be appropriately grooved to matingly engage teeth on the timing belt 165 in a manner similar to drive plate 46 shown in FIG. 5 to insure positive linear movement of the sensor carriage 145 along carriage support rod 150 for each linear increment of movement of the timing belt 165 as produced by controlled angular travel of the stepper motor 156.

The controls for the sensor S including timing and power signals and the interchange of video and control signals between the sensor S and a control system for the film video player apparatus 10 is necessitated. The nature of such signals is dependent upon the characteristics of a particular sensor which may be employed as well as related control circuitry. FIGS. 1 and 2 depict an exemplary flexible circuit, generally indicated by the numeral 170, consisting of a cable 171 having a connecting portion 172 proximate one extremity attached to the sensor S of sensor carriage 145 (FIG. 2) and having an opposite extremity 173 which may be attached to a signal processing board 174 (FIGS. 1-3) which may be mounted on a portion of the zoom carriage 25 of film video player 10. While theoretically any angular extent of rotation in either direction, clockwise or counterclockwise, to 180 degrees may be imparted to the lens box assembly 130 by worm gear 101, rotation though approximately 100 degrees in either direction is adequate to handle vertical format film and most editing requirements. Such an extent of rotation can be accommodated by flexible circuit 170 as disclosed in U.S. Patent Application Ser. No. 143,657, for "Video Player Sensor Cable", filed of even date.

Referring particularly to FIGS. 1 and 2, the connecting portion 172 of flexible cable 170 is adapted to be supported by an upstanding cable mount 180 affixed to sensor carriage 145 to which connecting portion 172 may be selectively attached as by a machine screw 181 or other fastener. The connecting portion 172 extends about a portion of the circumference of sensor S and has an extremity 172' which is attached to a standoff bracket 182 projecting from sensor carriage 145 as by a machine screw 183 or other fastener (FIG. 2). In addition, flexible cable 170 may be both mechanically and electrically interconnected with sensor S by virtue of a projecting tab 172" as seen in FIGS. 1 and 2. Details of an interconnection of tab 172" with sensor S are set forth in U.S. Patent Application Ser. No. 143,657, "Video Player Sensor Cable", filed of even data.

Thus it should be evident that the film video player apparatus disclosed herein carries out the various objects of the invention set forth hereinabove and otherwise constitutes an advantageous contribution to the art. As will be apparent to persons skilled in the art, modifications can be made to the preferred embodiment disclosed herein without departing from the spirit of the invention, the scope of the invention being limited solely by the scope of the attached claims.

I claim:

1. A film video player having means mounting photographic film in relation to imaging means having a lens for projecting at least a portion of a film frame image on a sensor which converts a sensor image to a video signal for video display comprising, means for changing the magnification of the sensor image with respect to the film frame image, means for translating the sensor with respect to the film frame image in a first direction, and means for translating the sensor with respect to the film frame image in a second direction perpendicular to the first direction and for rotating the sensor with respect to the film frame image, wherein the lens has a fixed focal length and said means for changing the magnification of the sensor image with respect to the film frame image includes means for selectively varying the distance between the lens and the photographic film for effecting a selected magnification, including means for varying the distance between the sensor and the lens for maintaining the sensor image in focus at any selected magnification.

2. A film video player as defined in claim 1, including a base mounting the photographic film and zoom carriage means movable relative to said base means and carrying the lens.

3. A film video player as defined in claim 1 wherein said means for varying the distance between the sensor and the lens includes sensor carriage means mounting the sensor for movement axially of the lens.

4. A film video player as defined in claim 1, wherein the lens and the sensor are mounted in lens box means which maintains the lens and sensor axially aligned.

5. A film video player as defined in claim 1 wherein said means for translating the sensor with respect to the film frame image includes scan carriage means.

6. A film video player having means mounting photographic film in relation to imaging means having a lens for projecting at least a portion of a film frame image on a sensor which converts a sensor image to a video signal for video display comprising, means for changing the magnification of the sensor image with respect to the film frame image, and gear assembly means for translating the sensor with respect to the film frame image and for rotating the sensor with respect to the film frame image, wherein said gear assembly means includes gear means mounting the sensor for movement therewith, wherein said gear means is a helical gear which is driven by worm shaft means.

7. A film video player as defined in claim 6, wherein said worm shaft means includes a pair of worm shafts mounted in spaced parallel relation and operatively engaging said helical gear.

8. A film video player as defined in claim 7, wherein each of said worm shafts has threads of the same hand and means for rotating said worm shafts, whereby rotating said worm shafts in the same direction effects translation of the sensor relative to the film frame image and rotating said worm shafts in opposite directions effects rotation of the sensor relative to the film frame image.

9. A film video player as defined in claim 7, wherein housing means encapsulates said helical gear and a portion of each of said worm shafts, thereby maintaining said helical gear in operative engagement with said worm shafts.

10. A film video player as defined in claim 9, wherein said helical gear is supported within said housing means by bearing assemblies, positioned axially to either side of said helical gear.

11. A film video player as defined in claim 7, wherein said housing means is a clamshell housing having projecting ears which mount bushings for supporting said worm shafts.

12. A film video player as defined in claim 11, wherein said worm shafts are selctively independently driven by stepper motors connected to said worm shafts by timing belts.

13. A film video player as defined in claim 6, wherein said gear assembly means carries lens box means mounting both the sensor and the lens for translation with respect to the film frame image and for rotation with respect to the film frame image.

14. A film video player as defined in claim 13, wherein the sensor is mounted on a sensor carriage movable axially relative to the lens.

15. A film video player as defined in claim 14, wherein said sensor carriage is mounted on a support rod attached to said lens box and a timing belt attached to said sensor carriage is selectively driven by a stepper motor to position said sensor carriage along said support rod.

16. A film video player as defined in claim 6, including scanning means for translating the sensor with respect to the film frame image in a direction at an angle to the direction of translation of the sensor by said gear assembly means.

17. A film video player as defined in claim 16, wherein yoke means carrying a worm shaft are mounted on said means for changing the magnification of the sensor image with respect to the film frame image and said scanning means has a toothed plate which matingly engages said worm shaft.

18. A film video player as defined in claim 17, wherein a timing belt powered by a stepper motor drives said worm shaft for selective displacement of said scanning means along said worm shaft.

19. A film to video player having means mounting a photographic film frame in relation to light source optics comprising lens means having a fixed focal length for projecting at least a portion of a film frame image on sensor means which converts the image to a video signal, means for magnifying the film frame image by varying the distance between the film frame and said lens, means for translating said sensor means and said lens means with respect to the film frame in a first direction, and means for translating said sensor means and said lens means with respect to the film frame in a second direction perpendicular to the first direction and for rotating the sensor means and said lens means with respect to the film frame, wherein said means for magnifying the film frame image includes a zoom carriage means movable relative to base means and positioning said lens means at varying distances from the film frame, including means for varying the distance between said sensor means and said lens means for maintaining the image on said sensor means in focus at any selected magnification.

20. A film to video player as defined in claim 19, wherein said means for varying the distance between said sensor means and said lens means includes sensor carriage means mounting said sensor means for movement axially of said lens means.

21. A film to video player as defined in claim 19, wherein said lens means and said sensor means are mounted in lens box means which maintains said lens means and said sensor means axially aligned.

* * * * *